United States Patent [19]
Shim et al.

[11] Patent Number: 6,021,939
[45] Date of Patent: Feb. 8, 2000

[54] METHOD OF PRODUCING A WEAR RESISTANT MECHANICAL COMPONENT

[75] Inventors: Tong Seub Shim; Kyung Woon Kim, both of Incheon, Rep. of Korea

[73] Assignee: Daewoo Heavy Industries Ltd., Incheon, Rep. of Korea

[21] Appl. No.: 09/000,925

[22] Filed: Dec. 30, 1997

[30] Foreign Application Priority Data

| Dec. 30, 1996 | [KR] | Rep. of Korea | 96-76867 |
| Dec. 30, 1996 | [KR] | Rep. of Korea | 96-76868 |
| Jul. 18, 1997 | [KR] | Rep. of Korea | 97-33468 |
| Jul. 18, 1997 | [KR] | Rep. of Korea | 97-33469 |

[51] Int. Cl.$^7$ ................................................. B23K 31/02
[52] U.S. Cl. .................... 228/122.1; 228/124.5; 228/233.2
[58] Field of Search ................ 228/121, 124.5, 228/231, 233.2, 122.1

[56] References Cited

U.S. PATENT DOCUMENTS

| 5,076,863 | 12/1991 | Taniguti et al. | 148/127 |
| 5,390,843 | 2/1995 | Ito et al. | 228/124.1 |
| 5,770,322 | 6/1998 | Nishioka et al. | 428/627 |
| 5,783,314 | 7/1998 | Yamagiwa et al. | 428/627 |
| 5,809,842 | 9/1998 | Yamagiwa et al. | 74/569 |

FOREIGN PATENT DOCUMENTS 6-74811  9/1994  Japan .

*Primary Examiner*—Patrick Ryan
*Assistant Examiner*—Kiley Stoner
*Attorney, Agent, or Firm*—Staas & Halsey LLP

[57] ABSTRACT

A method of producing a wear resistant mechanical component is disclosed which enables the crown value of a wear resistant tip to be controlled at one's desire. A component preform is provided by placing the wear resistant tip on a metal body with a brazing material interposed between them. The wear resistant tip has a smaller coefficient of thermal expansion than that of the metal body. The component preform is heated up to a brazing temperature selected from the temperature range between an austenite transformation starting temperature at which the metal body begins to undergo austenitic transformation and an austenitic transformation ending temperature at which the metal body terminates the austenitic transformation. The heated component preform is cooled down to the normal temperature so that the wear resistant tip is deformed into a crown shape having a crown value corresponding to the brazing temperature. The crown value of the wear resistant tip can be further controlled by varying either the holding time at the brazing temperature or the cooling rate of the component preform. The crown value of the wear resistant tip decreases as the brazing temperature gets higher, as the holding time at the brazing temperature becomes longer or as the cooling rate grows lower.

7 Claims, 7 Drawing Sheets

METHOD OF PRODUCING A WEAR RESISTANT MECHANICAL COMPONENT

FIELD OF THE INVENTION

The present invention relates generally to a method of producing a wear resistant mechanical component and more specifically to a method of brazing a wear resistant tip to a metal body with a sliding surface, to produce wear resistant mechanical components such as a valve lift, a tappet, a cam follower, a rocker arm and so on.

BACKGROUND OF THE INVENTION

A wear resistance-requiring mechanical component, e.g., a tappet, has been widely used for the purpose of opening and closing a suction valve and an exhaust valve of an engine. The tappet comes into contact with a cam surface at its bottom side so as to convert a rotational movement of a cam shaft into a vertical movement thereof, thus opening and closing the valves via a rocker arm. The conventional tappet comprises a metal body and a wear resistant tip, the latter of which is provided with a crown-shaped sliding surface whose middle section is higher than its periphery by several to several tens micrometers. This wear resistant tip, for example, is made of silicon nitride, silicon carbide, sialon or cemented carbide and can be brazed to the metal body.

There are two ways of making the crown-shaped sliding surface of the wear resistant tip. One way is to sinter the wear resistant tip and then to grind the sintered wear resistant tip into the crown shape, which costs too much because the crown-shaped surface is a tertiary curved surface. The other way is to give the crown shape to a ceramic in advance of sintering and then to sinter it into the wear resistant tip. This way, however, tends to deteriorate dimensional precision of the wear resistant tip due to contraction of the tip during the sintering process.

As a solution to the above-stated problems, Japanese Patent Publication No. 6-74811 discloses a method of producing a sliding part in which a wear resistant member having a smaller coefficient of thermal expansion than that of the metal body is thermally brazed to the sliding surface so that the opposite surface of the wear resistant member from the brazed surface is deformed into the crown shape owing to the difference in the coefficient of thermal expansion.

Nevertheless, the method disclosed in the Japanese publication still has a problem in that the crown value becomes too high when the brazed surface between the metal body and the wear resistant member is vast or when the difference between their coefficients of thermal expansion is large. This problem is remarkable in case of brazing steel and silicon nitride($Si_3N_4$) whose coefficients of thermal expansion are $13 \times 10^{-6}/°C$. and $3.2 \times 10^{-6}/°C$., respectively. If the crown value is exceedingly great as stated above, not only the periphery of the wear resistant member is apt to be cracked due to the increased residual stress, but also the stress is concentrated in the middle section of the wear resistant member, thus resulting in the fracture of the wear resistant member. If the crown value is too small to the contrary, the sliding surface becomes so flat that a desired shape of the wear resistant mechanical component cannot be achieved. In a nutshell, the Japanese publication does not disclose a method whereby the crown value of the wear resistant member is precisely controlled, but teaches a method of merely deforming the wear resistant member into the crown shape.

SUMMARY OF THE INVENTION

Taking into account the problems of the prior art referred to hereinabove, it is an object of the invention to provide a method of producing a wear resistant mechanical component which enables precise controlling of the crown value.

According to an aspect of the invention, a method of producing a wear resistant mechanical component is provided which comprises the steps of providing a component preform by placing a wear resistant member on a metal body with a brazing material interposed therebetween, the metal body being capable of transformation at an elevated temperature, the wear resistant member having a smaller coefficient of thermal expansion than that of the metal body; heating the component preform up to a first temperature selected from the temperature range between a transformation starting temperature at which the metal body begins to undergo its transformation and a transformation ending temperature at which the metal body terminates its transformation; and causing the heated component preform to be cooled down to a normal temperature so that the wear resistant member is deformed into a crown shape.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
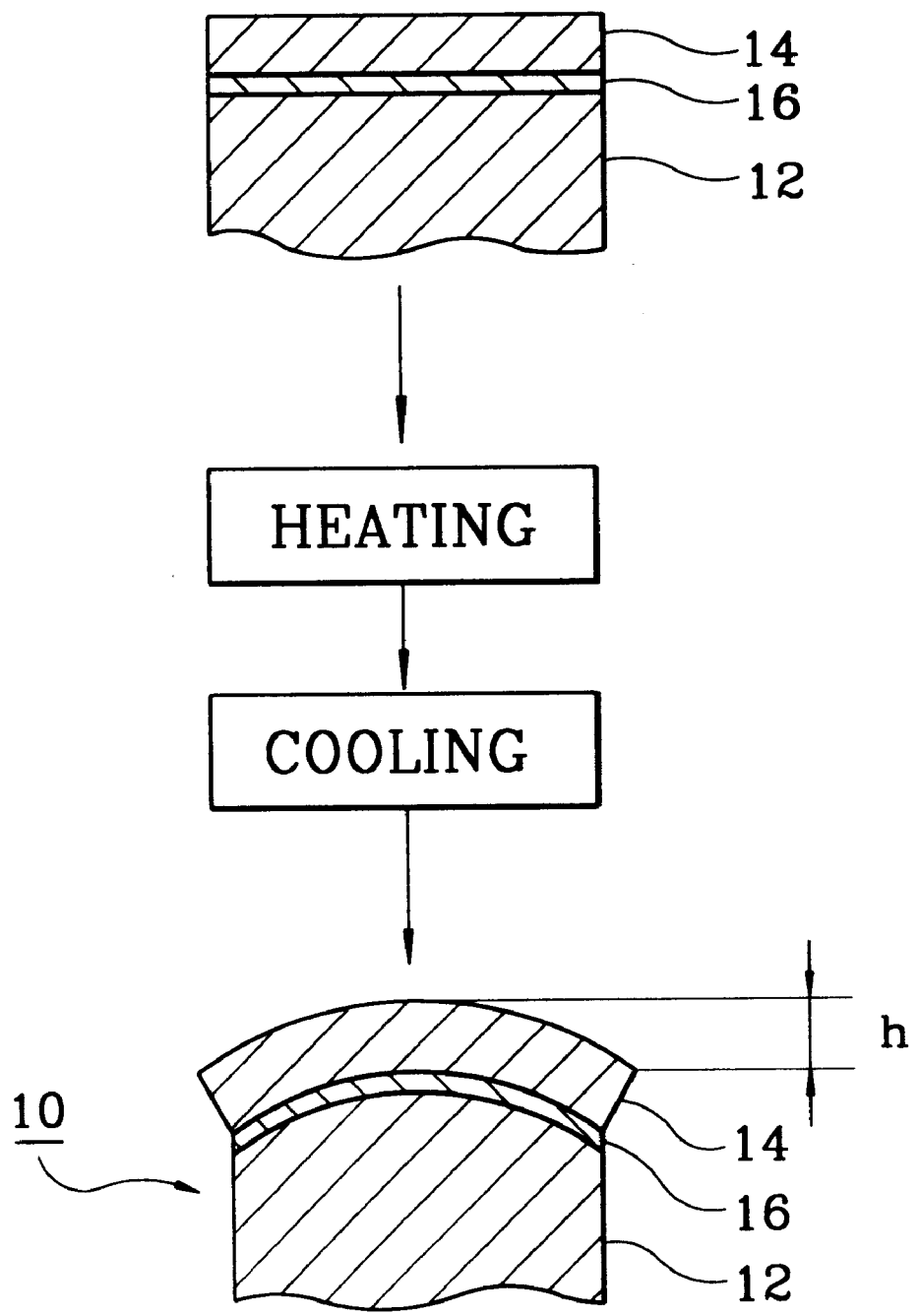
FIG. 1 is an explanatory view illustrating a method of producing a wear resistant mechanical component having a crown-shaped wear resistant member.

As shown in FIG. 1, a wear resistant mechanical component 10 is produced by way of placing a wear resistant tip, e.g., a silicon nitride tip 14 on a metal body, e.g., steel body 12 with a brazing material 16 interposed therebetween to obtain a component preform, heating the component preform up to a first temperature, namely, a brazing temperature and then causing the heated component preform to be cooled down. Because the coefficient of thermal expansion of the steel body 12 is as high as $13 \times 10^{-6}/°C$., the steel body 12 inclines to expand and contract more heavily than the silicon nitride tip 14 whose coefficient of thermal expansion is nothing more than $3.2 \times 10^{-6}/°C$. An alloy having a lower melting point than those of the metal body 12 and the silicon nitride tip 14 is used as the brazing material 16. Examples of the alloy include an Ag—Cu—Ni based alloy, an Ag—Cu—In—Ni based alloy, an Ag—Cu—Sn—Ni based alloy, a Cu—Mn—Ni based alloy and an Ni—Si—B—Fe based alloy.

As the component preform consisting of the steel body 12, the silicon nitride tip 14 and the brazing material 16 is heated to a higher temperature than the melting point of the brazing material 16 and subsequently cooled down to the normal temperature, the silicon nitride tip 14 is brazed to the steel body 12 by means of the brazing material 16. Since the coefficient of thermal expansion of the steel body 12 is larger than that of the silicon nitride tip 14, the steel body 12 is contracted much more than the silicon nitride tip 14 at the cooling step, with the result that the silicon nitride tip 14 is deformed into a crown shape. This means that the middle section of the silicon nitride tip 14 gets higher than its periphery by "crown value h".

Figure 2:
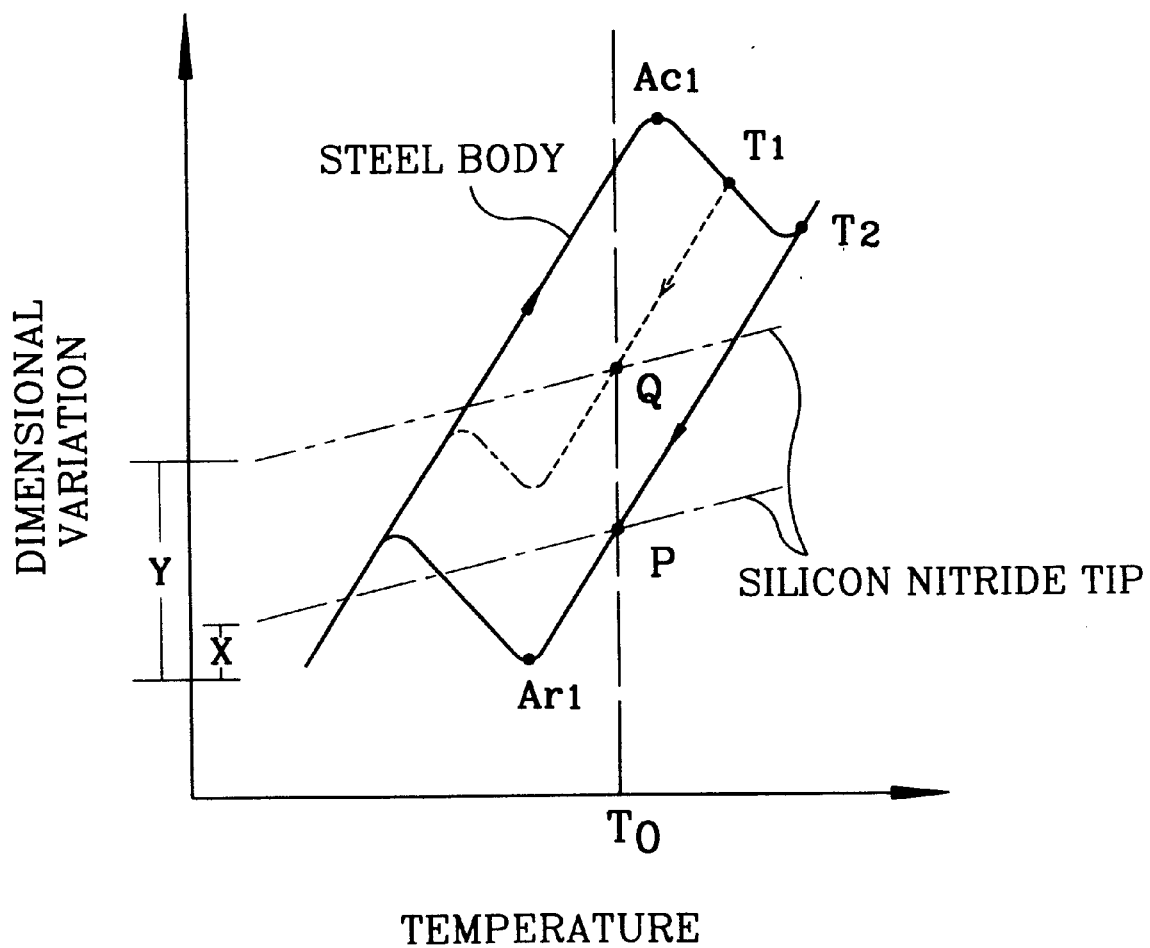
FIG. 2 is a diagram showing the behaviors of thermal expansion of a steel body and a silicon nitride tip against the temperature.

The steel body 12 undergoes volumetric expansion due to transformation or precipitation at the heating and cooling steps. As shown in FIG. 2, the steel body 12 is expanded along a heating curve depicted by a solid line in response to the heating of the component preform and the ferrite in the steel body 12 begins to be transformed into austenite at a transformation starting temperature $Ac_1$, e.g., 728° C. The austenitic transformation is terminated when the temperature of the steel body 12 reaches an austenitic transformation ending temperature $T_2$. At the cooling step, the steel body 12 is contracted until it arrives at point $Ar_1$ through point P along the cooling curve. At point $Ar_1$, the austenite is transformed into bainite, martensite or ferrite, which causes the steel body 12 to be expanded again. Subsequently, the steel body 12 is contracted along the initial region of the heating curve, as a result of which the heating curve and the cooling curve form a so-called "hysteresis loop".

The brazing material 16 is solidified at a solidus point and begins to have strength at temperature $T_0$ which is 100° C. lower than the solidus point. The cooling curve(a solid line) of the steel body 12 meets with the cooling curve(a single dotted chain line) of the silicon nitride tip 14 at point P and there exists no strain between the steel body 12 and the silicon nitride tip 14. As the cooling step is further proceeded, the steel body 12 is contracted more intensely than the silicon nitride tip 14, with the result that strain corresponding to "X" is generated between the steel body 12 and the silicon nitride tip 14 at the normal temperature. This gives rise to a bending moment which causes the silicon nitride tip 14 to be deformed into the crown shape having a crown value proportional to strain X.

Meanwhile, if the component preform is cooled down after it is heated to a brazing temperature $T_1$ which is higher than the austenitic transformation starting temperature $Ac_1$ and lower than the austenitic transformation ending temperature $T_2$, the steel body 12 is contracted along the cooling curve depicted by a dotted line and the silicon nitride tip 14 is contracted along a cooling curve depicted by a double dotted chain line. That is to say, the cooling curve of the silicon nitride tip 14 moves upwardly and meets with the cooling curve of the steel body 12 at point Q. As a result, strain corresponding to "Y" is generated between the steel body 12 and the silicon nitride tip 14 at the end of the cooling step. Because strain Y is considerably greater than strain X which is generated when the component preform is heated to the higher brazing temperature than the austenitic transformation ending temperature $T_2$, the crown value of the silicon nitride tip becomes larger accordingly.

As can be noted from the forgoing, the crown value of the silicon nitride tip 14 can be precisely controlled by suitably selecting the brazing temperature from between the austenitic transformation starting temperature $Ac_1$ and the austenitic transformation ending temperature $T_2$. Within the temperature range between the austenitic transformation starting temperature $Ac_1$ and the austenitic transformation ending temperature $T_2$, the austenitic transformation amount increases as the brazing temperature becomes higher but decreases as the brazing temperature becomes lower. The increase of the austenitic transformation amount means that the crown value is relatively small because of the reduction of the strain between the cooled steel body 12 and the cooled silicon nitride tip 14. In contrast, the decrease of the austenitic transformation amount leads to a larger crown value owing to the increase of the strain between the cooled steel body 12 and the cooled silicon nitride tip 14.

Transformation of pearlite into austenite is accomplished by separation of carbon from cementite($Fe_3C$) and diffusion of the separated carbon into a Fe-lattice of austenite in the course of transformation of ferrite with a body-centered cubic lattice structure into austenite with a face-centered cubic Lattice structure. In this way, the austenitic transformation amount is influenced by the holding time at the brazing temperature as well as the brazing temperature because the austenitic transformation is essentially accompanied by the diffusion of the carbon. So to speak, the higher the brazing temperature and the longer the holding time at the brazing temperature, the larger the austenitic transformation amount becomes. In turn, the larger the austenitic transformation amount, the smaller the crown value of the silicon nitride tip 14 becomes. Accordingly, the crown value of the silicon nitride tip 14 can be precisely controlled by suitably selecting the brazing temperature and/or the holding time at the brazing temperature.

In addition, the difference between the coefficients of thermal expansion of the steel body 12 and the silicon nitride tip 14 leaves a residual stress in the brazed portion during the cooling step, which influences, together with the brazing temperature and the holding time at the brazing temperature, upon the crown value of the silicon nitride tip 14. In other words, the crown value of the silicon nitride tip 14 increases as the residual stress gets higher, and vice versa. The magnitude of the residual stress is a function of a cooling rate of the component preform and therefore can be controlled by varying the cooling rate.

Although the inventive method of producing a wear resistant mechanical component has been described hereinbefore by taking the steel body 12 and the silicon nitride tip 14 as an example, the metal body of the wear resistant mechanical component may be made of any other kind of metal which is capable of transformation at an elevated temperature, provided that it exhibits high hardenability at a relatively lower cooling rate or during a cooling step using an inert gas. Also, it is possible to use any other kind of wear resistant tip than the silicon nitride tip 14, such as a cemented carbide tip, a zirconia tip or a silicon carbide tip.

EXAMPLE 1

A plurality of component preforms were obtained by placing disc-type wear resistant tips on disc-type metal bodies with brazing materials interposed therebetween. As the metal body, a steel body was used which has a diameter of 32 mm and a thickness of 5 mm and consists by weight of C 0.25–0.35%, Si 0.15–0.35%, Mn 0.35–0.60%, Ni 2.5–3.5%, Cr 2.5–3.5%, Mo 0.5–0.7%, S 0.03% or less, Cu 0.03% or less, P 0.03% or less and balance iron. A silicon nitride tip which has a diameter of 32 mm, a thickness of 1.5 mm and a coefficient of thermal expansion of $3.2 \times 10^{-6}/°C$. was used as the wear resistant tip. The brazing material was an Ag—Cu—In—Ti alloy which has a liquid line of 720° C. and a solid line of 620° C. and consists by weight of Cu 24%, In 14%, Ti 2% and balance silver.

Wear resistant mechanical components were produced by heating each of the resultant component preforms up to a first temperature, namely, one of various brazing temperatures selected from the temperature range of 660–840° C. under a vacuum atmosphere, maintaining the heated component preforms at the respective brazing temperature for ten minutes and cooling down the component preforms to the normal temperature within a furnace. The crown value of the wear resistant tip of the mechanical components was measured and the result of measurement is shown in Table 1 and FIG. 3 where the crown value indicates the height of the middle section of the wear resistant tip relative to its periphery.

TABLE 1

| Brazing Temperature (° C.) | 660 | 680 | 720 | 740 | 755 | 775 | 800 | 820 |
|---|---|---|---|---|---|---|---|---|
| Crown Value ($\mu$m) | 110 | 109 | 75 | 50 | 44 | 33 | 20 | -12 |

Figure 3:
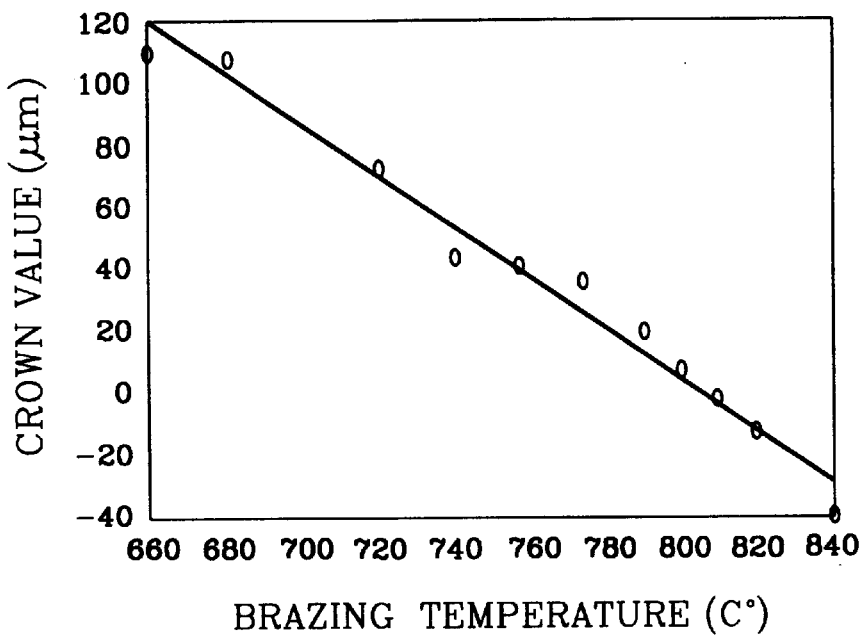
FIG. 3 is a diagram showing the relationship between a brazing temperature and a crown value of the wear resistant member in case of using a silicon nitride tip as the wear resistant member.

As seen from Table 1 and FIG. 3, the crown value decreases as the brazing temperature becomes higher and, particularly, has a negative value at the brazing temperature of 810° C. or more, which causes the wear resistant tip to be deformed into a concave shape. This means that the crown value of the wear resistant tip depends not only on the difference in the coefficients of thermal expansion, but also on the brazing temperature. Accordingly, the crown value of the wear resistant tip can be arbitrarily and accurately controlled by suitable selection of the brazing temperature.

EXAMPLE 2

In the same manner as in example 1, wear resistant mechanical components were produced by way of providing a plurality of component preforms, heating the component preforms up to the brazing temperature of 790° C., holding the component preforms at the brazing temperature for various periods of time and then cooling down the heated component preforms to the normal temperature. Table 2 and FIG. 4 show the result obtained from the crown value measurement of the respective tip of the wear resistant mechanical components.

TABLE 2

| Holding Time (min) | 0 | 5 | 10 | 20 | 30 | 40 | 50 | 60 |
|---|---|---|---|---|---|---|---|---|
| Crown Value ([m) | 40 | 31 | 20 | 11 | 4 | -10 | -16 | -15 |

Figure 4:
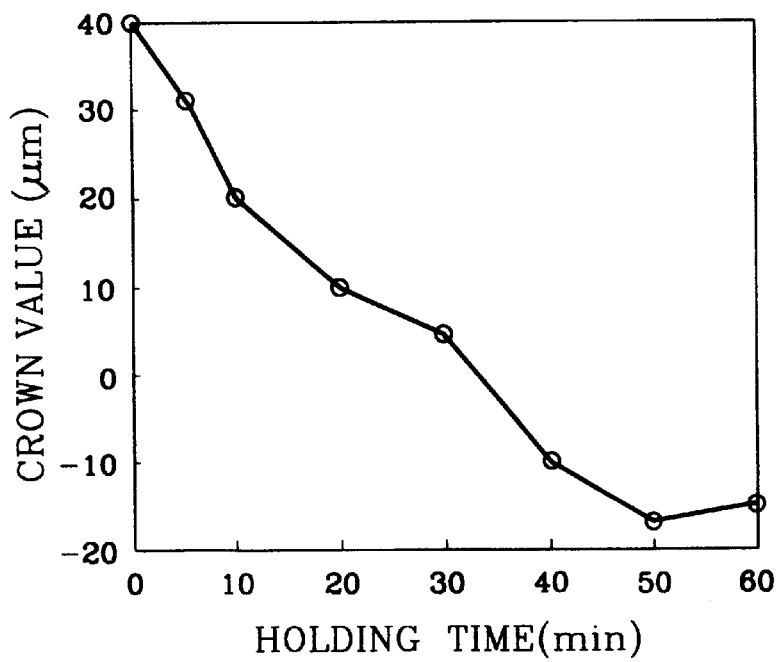
FIG. 4 is a diagram showing the relationship between a holding time at the brazing temperature and the crown value of the wear resistant member in case of using a silicon nitride tip as the wear resistant member.

It can be appreciated in Table 2 and FIG. 4 that the crown value of the wear resistant tips decreases as the holding time at the brazing temperature gets longer and particularly has a negative value at the holding time above thirty minutes, which causes the wear resistant tip to be deformed into a concave shape. Accordingly, the crown value of the wear resistant tip can be arbitrarily and precisely controlled by suitable setting of the holding time at the brazing temperature.

EXAMPLE 3

A plurality of component preforms were obtained by placing disc-type wear resistant tips on disc-type metal bodies with brazing materials interposed therebetween. The metal body and the brazing material were the same as used in example 1. The wear resistant tips were of two kinds, namely, a cobalt-based cemented carbide tip and a nickel-based cemented carbide tip, both of which has a diameter of 32 mm and a thickness of 1.5 mm.

Wear resistant mechanical components were produced by way of heating each of the resultant component preforms up to various brazing temperatures selected from the temperature range of 680–810° C. under a vacuum atmosphere, maintaining the heated component preforms at the respective brazing temperature for ten minutes and cooling down the component preforms to the normal temperature within a furnace. The crown value of the wear resistant tips was measured with respect to the respective wear resistant mechanical components. The result of measurement in case of using the cobalt-based cemented carbide tip is shown in Table 3 and FIG. 5 and the measurement result in case of using the nickel-based cemented carbide tip is shown in Table 4 and FIG. 6.

TABLE 3

| Brazing Temperature (° C.) | 680 | 703 | 720 | 740 | 790 | 810 |
|---|---|---|---|---|---|---|
| Crown Value ($\mu$m) | 65 | 49 | 41 | 20 | -8 | -25 |

TABLE 4

| Brazing Temperature (° C.) | 680 | 720 | 740 | 790 | 810 |
|---|---|---|---|---|---|
| Crown Value ($\mu$m) | 40 | 24 | 18 | -13 | -20 |

Figure 5:
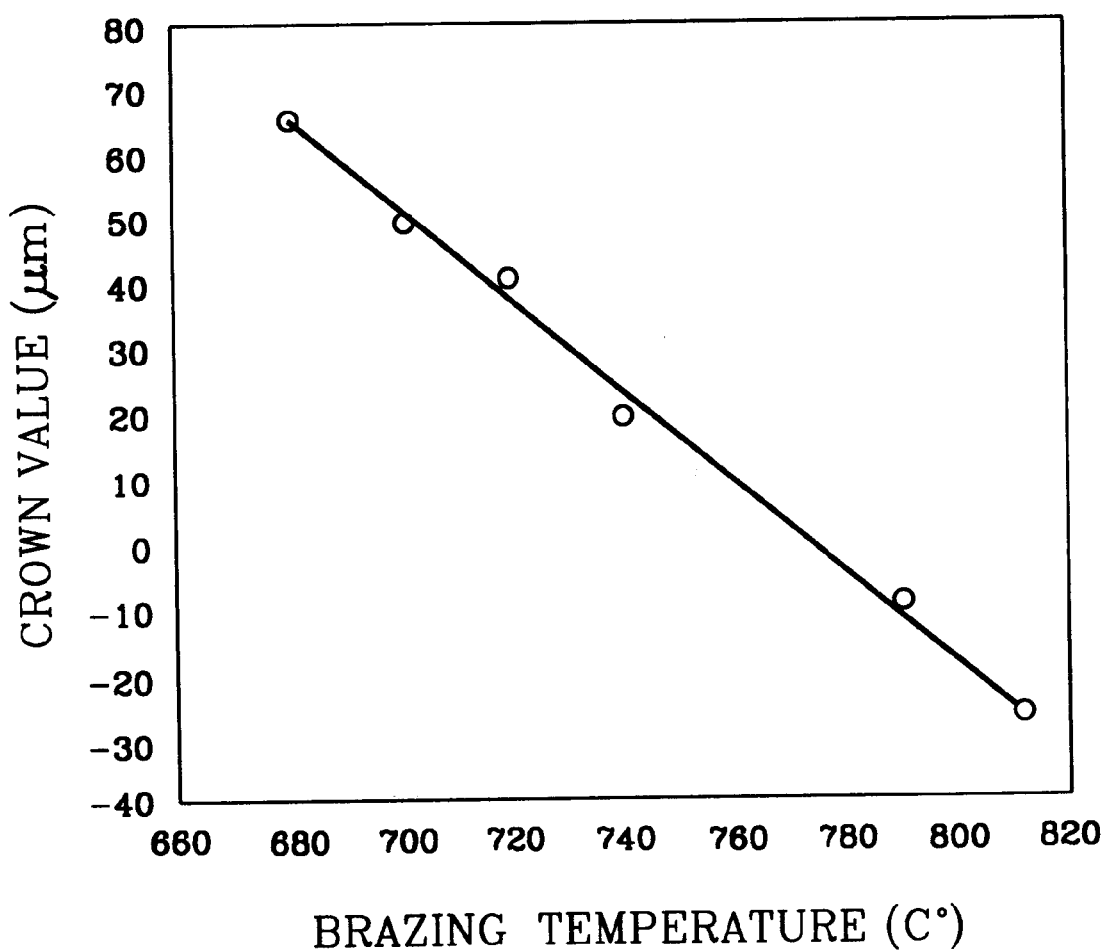
FIG. 5 is a diagram showing the relationship between the brazing temperature and the crown value of the wear resistant member in case of using a cobalt-based cemented carbide tip as the wear resistant member.
Figure 6:
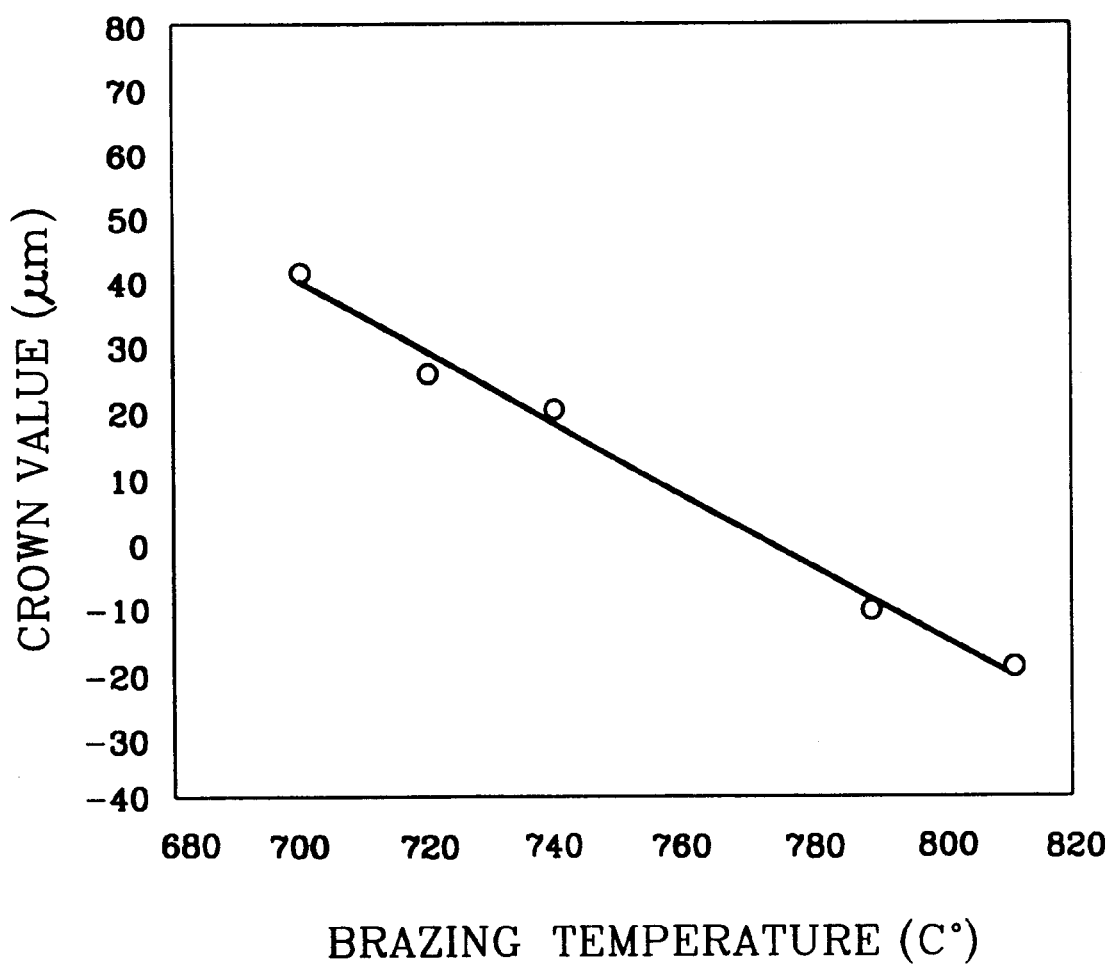
FIG. 6 is a diagram showing the relationship between the brazing temperature and the crown value of the wear resistant member in case of using a nickel-based cemented carbide tip as the wear resistant member.

As seen in Table 3, Table 4, FIG. 5 and FIG. 6, in case of using the cemented carbide tip as the wear resistant tip, the crown value decreases as the brazing temperature grows higher, meaning that the crown value of the wear resistant member can be arbitrarily and precisely controlled by suitable selection of the brazing temperature.

EXAMPLE 4

In a same way as in example 1, wear resistant mechanical components were produced by way of providing a plurality of component preforms, heating the component preforms up to the brazing temperature of 790° C. under a vacuum atmosphere, holding the component preforms at the brazing temperature for ten minutes and then cooling down the heated component preforms to the normal temperature at various cooling rates. Table 5 and FIG. 7 show the result obtained from the crown value measurement of the respective wear resistant tip of the wear resistant mechanical components.

TABLE 5

| Cooling Rate | Crown Value |
|---|---|
| 3° C./min | -3 $\mu$m |
| 10° C./min | 12 $\mu$m |
| 18° C./min | 20 $\mu$m |
| 100° C./min | 40 $\mu$m |

Figure 7:
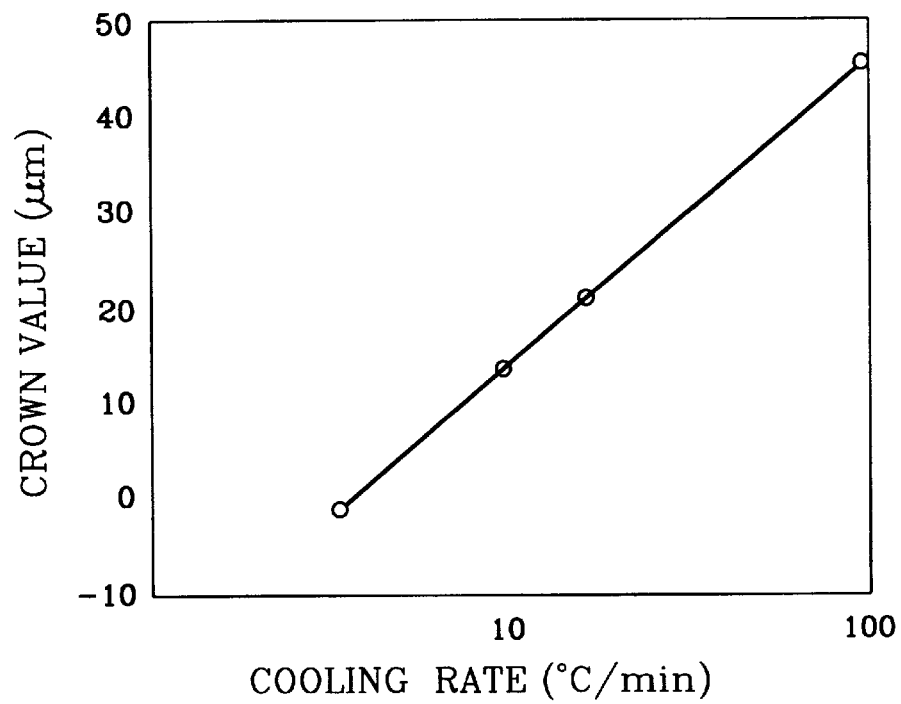
FIG. 7 is a diagram showing the relationship between the cooling rate of the component preform and the crown value of the wear resistant member in case of using the silicon nitride tip as the wear resistant member.

It can be seen in Table 5 and FIG. 7 that the crown value of the wear resistant tip decreases as the cooling rate gets lower. The reason for this is that the residual stress in the brazed portion is reduced at the decreased cooling rate. Accordingly, the crown value of the wear resistant tip can be arbitrarily controlled by suitable selection of the cooling rate.

EXAMPLE 5

In the same way as in example 1, wear resistant mechanical components were produced by way of providing a plurality of component preforms, heating the component preforms up to the brazing temperature of 790° C., holding the component preforms at the brazing temperature for ten minutes and then cooling down the heated component preforms to the normal temperature. At the cooling step, the respective wear resistant mechanical component was maintained at a second temperature, namely, the heat treatment temperature of 200° C., 300° C. and 400° C. for zero, thirty and sixty minutes. Table 6 and FIG. 8 show the result obtained from the crown value measurement of the respective wear resistant tip of the wear resistant mechanical components.

TABLE 6

| Heat Treatment Temperature | Holding Time | | |
|---|---|---|---|
| | 0 min | 30 min | 60 min |
| 200° C. | 0 μm | −1 μm | −1 μm |
| 300° C. | −30 μm | −45 μm | −65 μm |
| 400° C. | −40 μm | −55 μm | −85 μm |

Figure 8:
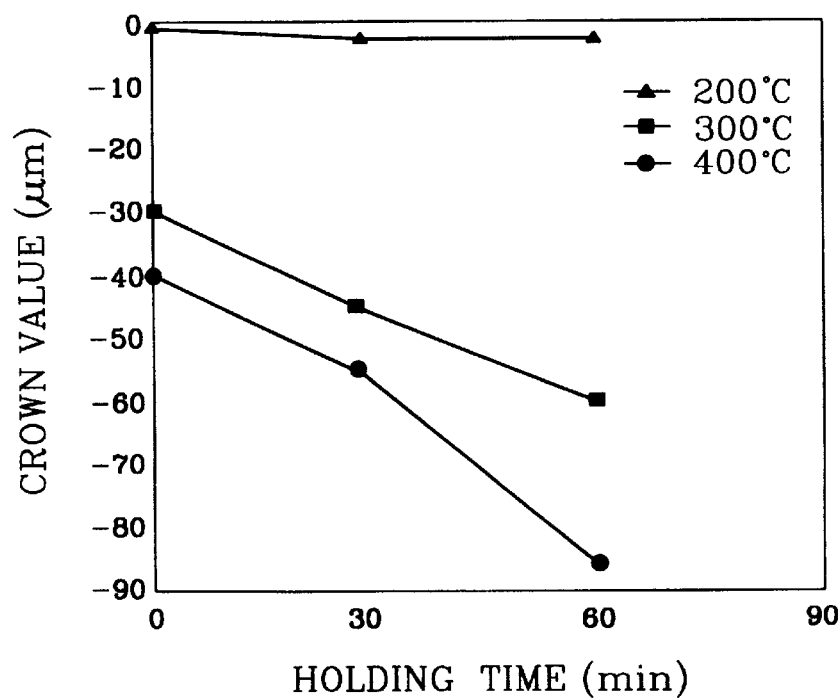
FIG. 8 is a diagram showing the relationship between the holding time at the heat treatment temperature of the component preform and the crown value of the wear resistant member in case of using the silicon nitride tip as the wear resistant member.

As is apparent in Table 6 and FIG. 8, the crown value of the wear resistant tip is nearly constant when the wear resistant mechanical components were maintained at the heat treatment temperature of 200° C. for various periods of time, but the crown values, in case of the heat treatment temperatures of 300° C. and 400° C., decreases as the holding time gets longer. Accordingly, the crown value of the wear resistant member can be also controlled by maintaining the wear resistant mechanical components at a suitable heat treatment temperature for a controlled holding time.

EXAMPLE 6

A plurality of component preforms were obtained by placing disc-type wear resistant tips on disc-type metal bodies with brazing materials interposed therebetween. The metal body and the brazing material were the same as used in example 1. The respective wear resistant tip was a cemented carbide tip which has a diameter of 32 mm, a thickness of 1.5 mm and a coefficient of thermal expansion of $5.1 \times 10^{-6}$/°C.

Wear resistant mechanical components were produced by heating each of the resultant component preforms up to the brazing temperature of 790° C. under a vacuum atmosphere, maintaining the heated component preforms at the brazing temperature for ten minutes and cooling down the component preforms to the normal temperature at various cooling rates. The crown value of the wear resistant tips was measured on the respective wear resistant mechanical components. The result of measurement is shown in Table 7 and FIG. 9.

TABLE 7

| Cooling Rate | Crown Value |
|---|---|
| 3° C./min | −23 μm |
| 10° C./min | −10 μm |
| 18° C./min | −4 μm |
| 100° C./min | 15 μm |

Figure 9:
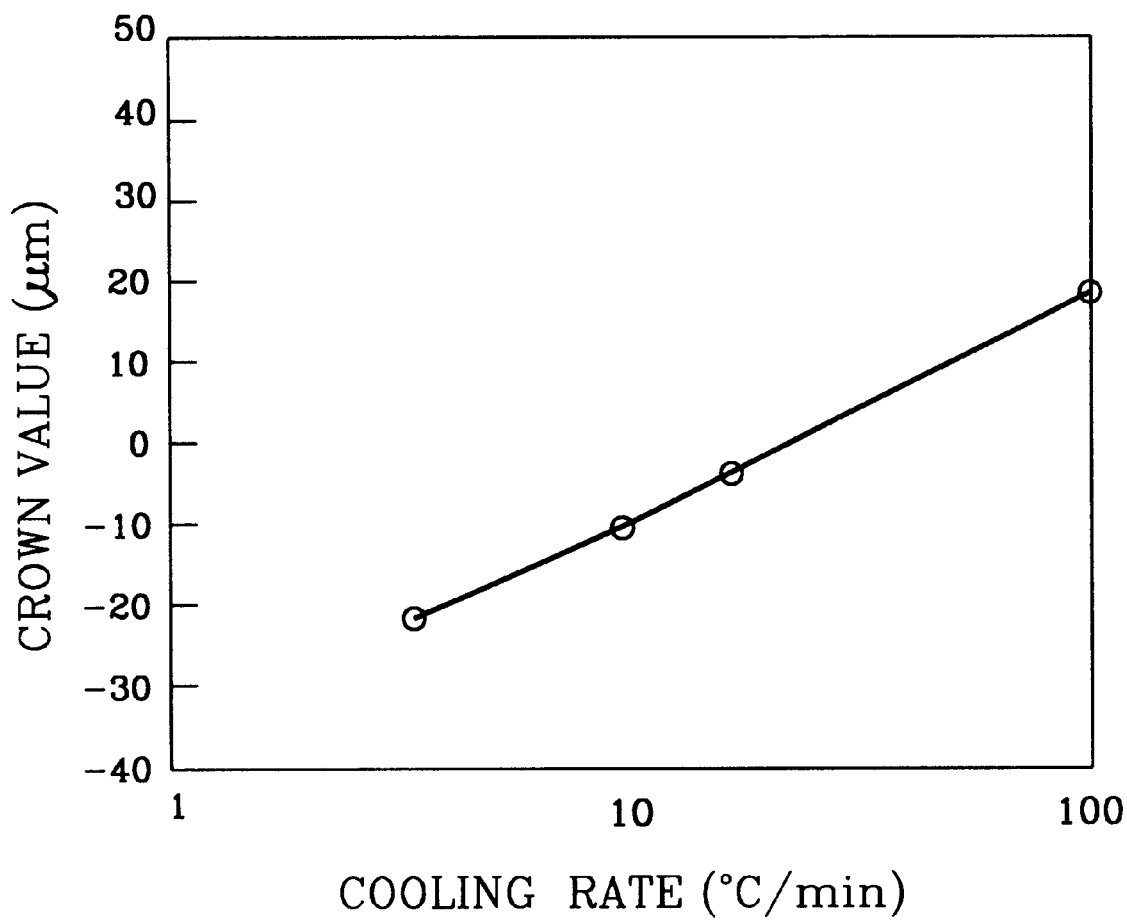
FIG. 9 is a diagram showing the relationship between the cooling rate of the component preform and the crown value of the wear resistant member in case of using the cemented carbide tip as the wear resistant member.

It can be noted in Table 7 and FIG. 9 that the crown value of the wear resistant tip decreases as the cooling rate becomes lower in case of using the cemented carbide tip. The reason for this is that the residual stress in the brazed portion is reduced at the decreased cooling rate. Accordingly, the crown value of the wear resistant tip can be further controlled by suitable selection of the cooling rate.

While the invention has been shown and described with reference to preferred embodiments, it should be apparent to one of ordinary skill in the art that many changes and modifications may be made without departing from the spirit and scope of the invention as defined in the claims.

What is claimed is:

1. A method of producing a wear resistant mechanical component, comprising the steps of:

i) providing a component preform by placing a wear resistant tip of flat shape on a metal body capable of austenitic transformation with a brazing material interposed therebetween, the wear resistant tip having a smaller coefficient of thermal expansion than that of the metal body;

ii) heating the component preform up to a brazing temperature higher than an austenitic transformation temperature of the metal body to thereby subject the metal body to austenitic transformation;

iii) controlling the amount of austenitic transformation of the metal body based on a preselected target crown value of the wear resistant tip; and iv) causing the heated component preform to be cooled down to a normal temperature so that the wear resistant tip can be deformed into a crown shape and can have the target crown value.

2. The method as recited in claim 1, wherein the amount of austenitic transformation of the metal body is controlled by way of regulating the brazing temperature of the component preform.

3. The method as recited in claim 1, wherein the amount of austenitic transformation of the metal body is controlled by way of regulating the time period during which the component preform is held at the brazing temperature.

4. The method as recited in claim 2, wherein the brazing temperature of the component preform is regulated in a range of 660–840° C.

5. The method as recited in claim 1, wherein the heated component preform is cooled down at a cooling rate of 3–100° C./min.

6. The method as recited in claim 1, wherein at step iv), the component preform is held for a controlled time period at a heat treatment selected from a temperature range between the brazing temperature and the normal temperature.

7. The method as recited in claim 1, wherein the metal body is made of steel and the wear resistant tip is made of one material selected from the group consisting of silicon nitride, cemented carbide, zirconia, alumina and silicon carbide.

* * * * *